United States Patent

[11] 3,624,698

| [72] | Inventor | Nelson Storm<br>213 Perry, Rossville, Ill. 60963 |
|---|---|---|
| [21] | Appl. No. | 64,188 |
| [22] | Filed | Aug. 17, 1970 |
| [45] | Patented | Nov. 30, 1971 |

[54] BRUSH-MOVING ATTACHMENT FOR TRACTOR
8 Claims, 5 Drawing Figs.

[52] U.S. Cl. ........................................... 56/25.4
[51] Int. Cl. ........................................... A01d 35/26
[50] Field of Search............................................ 56/10.3,
10.4, 10.6, 10.7, 10.9, 11.1, 11.8, 14.9, 15.2, 11.9, 15.3, 15.7, 15.8, 16.2

[56] References Cited
UNITED STATES PATENTS

| 1,882,016 | 10/1932 | Huntington | 56/16.2 |
| 3,221,482 | 12/1965 | Cowling | 56/15.8 |
| 3,274,762 | 9/1966 | Jolls | 56/15.2 |
| 3,308,611 | 3/1967 | Barber | 56/10.3 |
| 3,319,407 | 5/1967 | Jordan et al. | 56/10.7 |
| 3,462,925 | 8/1969 | Lanier | 56/10.9 |

Primary Examiner—Russell R. Kinsey
Attorney—Fred L. Witherspoon, Jr.

ABSTRACT: A brush-mowing attachment for tractors comprising an outrigger frame adapted to be secured to the chassis of the tractor. The outrigger frame extends laterally from the tractor between the front and rear wheels thereof and is supported at its free end by ground-engaging wheels. An articulated boom is mounted on the outrigger frame and is provided at its free end with power driven cutting means. The articulated boom is adapted to move the cutting means both vertically and horizontally relative to the tractor.

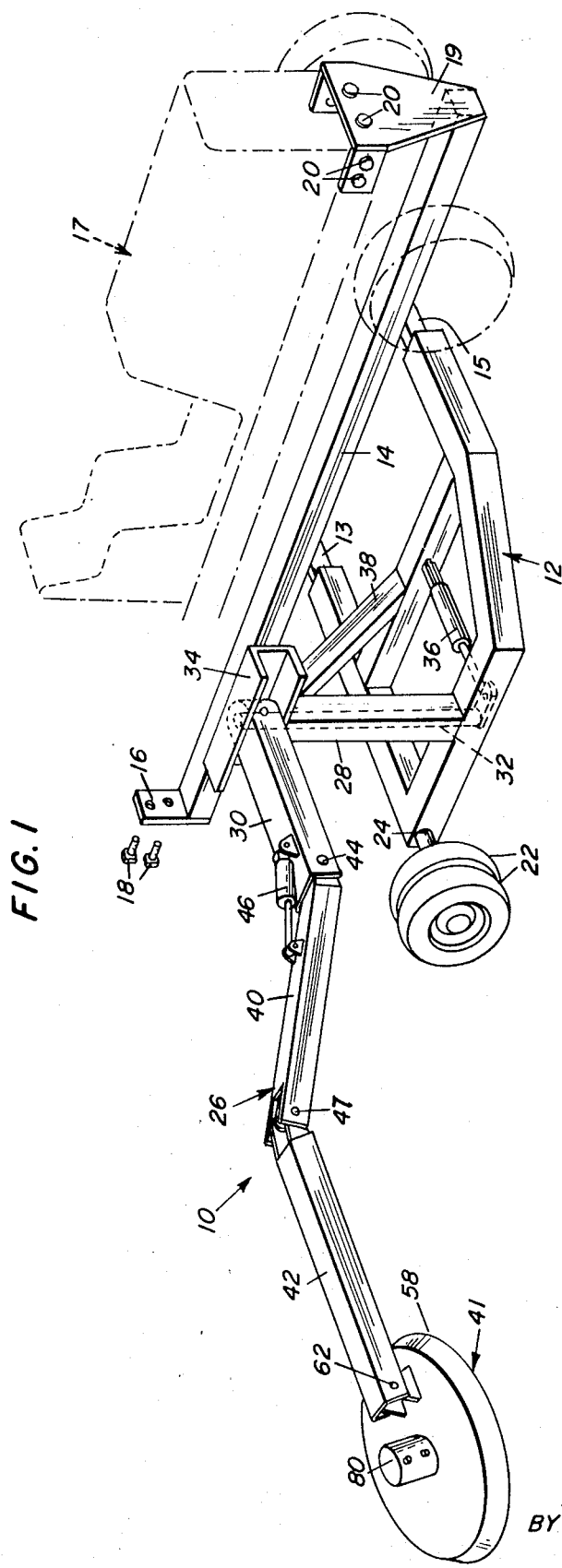

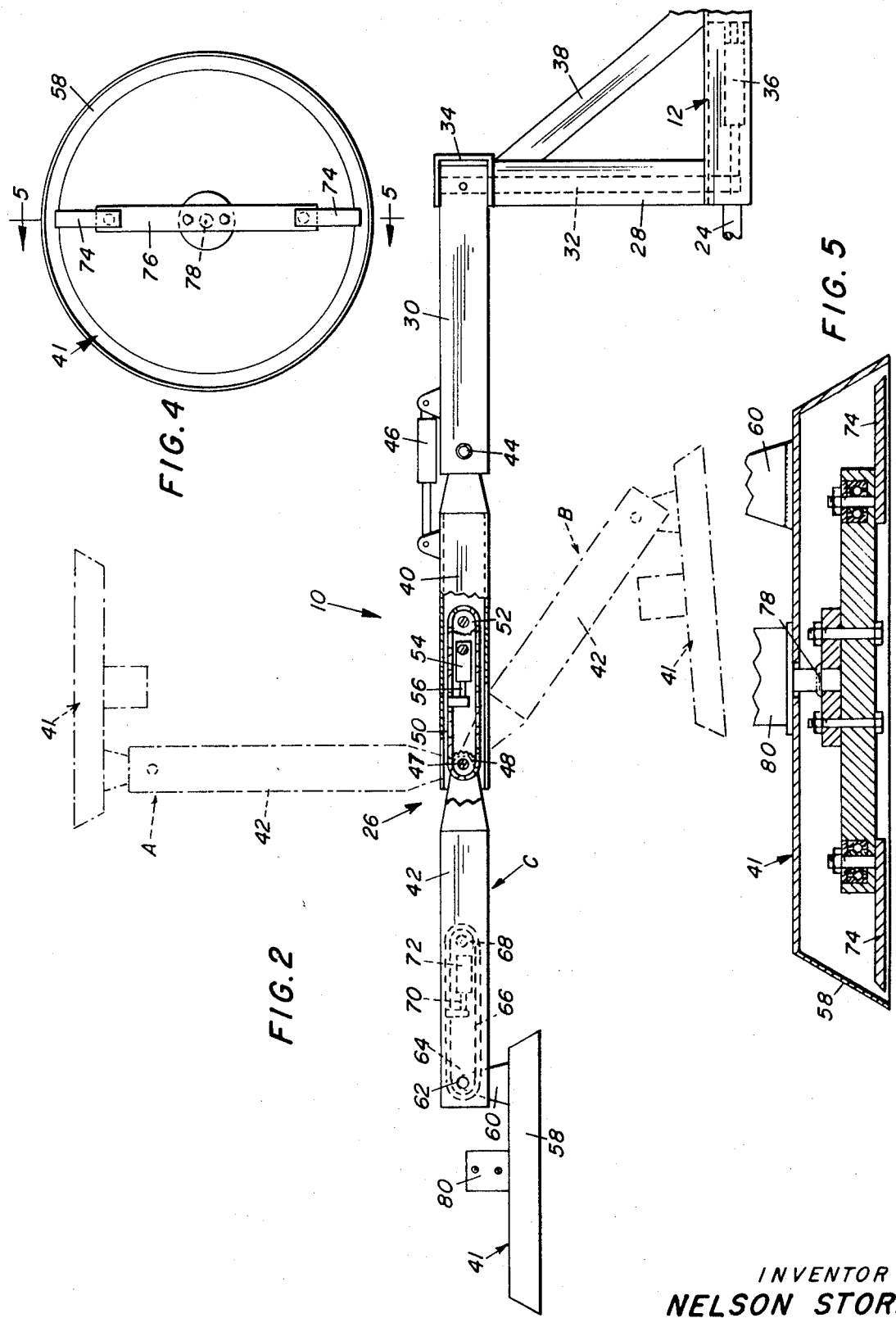

BRUSH-MOVING ATTACHMENT FOR TRACTOR

This invention relates to power driven means for cutting brush, trees, vines, weeds, grass etc. in inaccessible places, such as in roadside ditches, on steep roadbanks, and in dredged ditches.

The present invention has the ability to cut small trees having a trunk diameter up to substantially 6 inches as well as weeds and bush. The articulated boom can support the cutting means in an operative position a considerable distance laterally from the tractor. The distance of course depends upon the size of the boom. For purposes of illustration, the boom can be constructed so that it can reach out 20 feet from the tractor in a horizontal direction, it can also reach the same distance overhead of the tractor and substantially the same distance downward from the tractor.

Brush-cutting machines are presently available but are subject to many disadvantages and are limited in their maneuverability. Most known devices are constructed for attachment directly to the frame of a tractor or road grader in a manner so that the weight of the cutting machine is suspended entirely from one side of the tractor or grader. Such an arrangement is limited in size by the tendency of the cutting apparatus to turn the tractor or grader over due to the offset weight.

Even if the tractor or grader is provided with counterweight means to compensate for the weight of the cutting apparatus, there is a tendency for the one set of wheels to leave the ground on uneven terrain. This makes control of the cutting head very difficult. The instability of such apparatus presents a real danger to the operator.

Additionally, with known apparatus, considerable labor is required to secure and to remove the cutting apparatus from the tractor. Some of the known apparatus require 2 and ½ days to attach it to a tractor and a full day to remove it.

It is therefore an object of this invention to provide a brush-cutting apparatus which overcomes the aforesaid disadvantages.

It is another object of this invention to provide brush-cutting apparatus which may be attached to a tractor or the like in a manner so that the weight of the apparatus is evenly distributed on the tractor chassis.

It is still another object of this invention to provide brush-cutting apparatus which may be quickly and easily attached to or removed from a tractor or the like.

These and other objects of the invention will become more readily apparent from the following detailed description and accompanying drawings in which:

FIG. 1 is a perspective view of the cutting apparatus with a tractor to which it is attached partially shown in broken lines;

FIG. 2 is a side view of the cutting apparatus partially in section showing the pivoting mechanism.

FIG. 3 is a detailed view of the hinge connection to the beam attached to the tractor;

FIG. 4 is a bottom plan of view of the cutting means; and

FIG. 5 is a sectional view taken on line 5—5 of FIG. 4.

Referring to the drawings, the cutting apparatus 10 comprises an outrigger frame 12 hingedly secured to a beam 14 at 13 and 15. The beam 14 is provided at one end thereof with a bracket 16 adapted to be secured to the drawbar of the tractor 17 by bolts 18 or the like. A further bracket 19 is rigidly secured to the other end of the beam 14 for attachment to the front of the tractor 17 by bolts 20 as best shown in FIG. 1. The brackets 16 and 19 comprise the sole means of attachment of the cutting apparatus 10 to the tractor 17.

Dual wheels 22 are mounted on an axle 24 secured to the frame 12. If desired, a single wheels may be used in lieu of the dual wheels 22 as illustrated. Referring to FIG. 3, the hinged connections 13 and 15 of the outrigger frame 12 permit vertical movement of the wheels 22 relative to the beam 14. In this manner the tractor will not be affected by the wheels 22 engaging uneven terrain.

An articulated boom assembly 26 is mounted on an upright 28 rigidly secured to the frame 12 for horizontal swinging movement about the vertical axis of the upright 28.

The boom assembly 26 includes a beam 30 pivotally journaled in a bracket 34 secured to the top of the upright 28. A rod 32 secured at its top end to beam 30 extends downwardly through the upright 28 and is operatively connected to hydraulic means 36 which pivots the rod 32 and attached beam 30 through an arc approaching 180°. A brace 38 provides stability for the upright 28.

The articulated boom assembly 26 also has an inner section 40 and an outer section 42. The inner section 40 is mounted for vertical pivotal movement on a pin 44 journaled in the free end of the beam 30. Hydraulic means 46 are provided to pivot the inner section 40 in a vertical plane about the pin 44.

The outer section 42 is mounted on a pin 47 rotatably journaled in the free end of the inner section 40. A sprocket 48 is secured to the pin 47 for rotation therewith. A roller chain 50 engages the sprocket 48 and a further sprocket 52. In order to swing the outer section 42 in a vertical plane about the axis of the pin 47, a hydraulic cylinder 54 is secured to the inner section 40 with its piston rod 56 connected to the roller chain 50. When the piston rod is extended to the full length of its travel, the sprocket 48 will have been rotated, due to the movement of the roller chain, through an arc to position the outer section 42 as indicated by B in FIG. 2. When the piston rod 56 is moved to its fully retracted position, it rotates the sprocket in the reverse direction to swing the outer section 42 to the position indicated at A in FIG. 2.

In the illustrated embodiment, the length of movement of the piston rod 56 is such to cause the outer section 42 to swing through an arc of substantially 250°.

In the position indicated by C in FIG. 2, the outer section 42 is in substantial alignment with the inner section 40 to support the cutting means 41 in its outermost position from the tractor.

The cutting means 41 is mounted for vertical swinging movement about the free end of the outer section 42 in a manner similar to the mounting means for the outer section 42.

The cutting means 41 comprises a housing 58 with a support 60 secured thereto. The housing is rotatably mounted on the free end of the outer section 42 by means of pivot pin 62 which passes through the support 60. A sprocket 64 is mounted on the pin 62 and is rotated by a roller chain 66 engaged with sprocket 64 and an idler sprocket 68. The chain 66 is driven by a piston rod 70 and connected thereto and activated by hydraulic cylinder 72.

As described, the cutting means may be swung through an arc of substantially 230°.

The cutting means 41 is of the rotary type including a pair of cutting blades 74 secured to a drive bar 76 mounted on a spindle 78 rotatably journaled in the housing 58 and driven by a hydraulic motor 80.

It will be noted that all of the power means disclosed are of the hydraulic type which are controlled by conventional means. For this reason the controls are positioned on the tractor so as to be accessible to the operator.

It will thus be understood that the present invention provides means for cutting brush wherein the boom is adapted to support the cutting apparatus in a plurality of positions and wherein the boom is secured to the tractor in a manner whereby the stability of the tractor is not affected by the position of the cutting means.

I claim:

1. A brush-cutting attachment for tractors and the like comprising an outrigger frame, means for detachably securing the outrigger frame to the chassis of a tractor, wheel means attached to and supporting said outrigger frame, an articulated boom mounted on said outrigger frame and power-driven cutting means operatively supported on the free end of said boom.

2. A brush-cutting attachment for tractors and the like as set forth in claim 1 wherein the means for detachably securing the outrigger frame to the tractor chassis comprises a beam, a first bracket secured to one end of said beam and adapted to be removably secured to the rear of a tractor, and a second bracket secured to the other end of said beam adapted to be removably secured to the front of a tractor.

3. A brush-cutting attachment for tractors and the like as set forth in claim 2 wherein said outrigger frame is hingedly attached to said base.

4. A brush-cutting attachment for tractors and the like as set forth in claim 1 wherein the articulated boom is swingably supported on said outrigger frame between said wheels and said means for both horizontal and vertical movement.

5. A brush-cutting attachment for tractors and the like as set forth in claim 2 wherein said beam is supported beneath the tractor chassis and extends from the front to the rear substantially along the centerline of the tractor.

6. A brush-cutting attachment for tractors and the like as set forth in claim 5 wherein said outrigger frame is hingedly connected to said beam and extends laterally therefrom between the front and rear of the tractor.

7. A brush-cutting attachment as set forth in claim 1, wherein said articulated boom comprises a first section pivotally secured to the outrigger frame for horizontal swinging, power means attached to said first section for horizontally swinging same, a second section pivotally attached to the free end of the first section for vertical swinging, power means operatively connected to said second section for vertically swinging same, a third section pivotally mounted on the outer end of the second section for vertical swinging and power means operatively connected to said third section for vertically swinging same whereby the butting means is provided with universal movement.

8. The brush-cutting attachment as set forth in claim 7 and wherein the power-driven means supported on the free end of the boom is pivotally attached to the free end of the third section for vertical swinging and hydraulic means are provided for vertically swinging the cutting means.

* * * * *